United States Patent
Chiu (10) Patent No.: US 12,335,206 B2
(45) Date of Patent: Jun. 17, 2025

(54) GENERATIVE CHATBOT SYSTEM FOR VIRTUAL COMMUNITY AND METHOD THEREOF

(71) Applicants: SQ Technology (Shanghai) Corporation, Shanghai (CN); Inventec Corporation, Taipei (TW)

(72) Inventor: Chuan-Cheng Chiu, Taipei (TW)

(73) Assignees: SQ Technology (Shanghai) Corporation, Shanghai (CN); Inventec Corporation, Taipei (TW)

( * ) Notice: Subject to any disclaimer, the term of this patent is extended or adjusted under 35 U.S.C. 154(b) by 29 days.

(21) Appl. No.: 18/430,064

(22) Filed: Feb. 1, 2024

(65) Prior Publication Data

US 2025/0097169 A1 Mar. 20, 2025

(30) Foreign Application Priority Data

Sep. 15, 2023 (CN) .......................... 202311199533.2

(51) Int. Cl.
G06F 40/40 (2020.01)
G06V 40/16 (2022.01)
G06V 40/20 (2022.01)
H04L 51/02 (2022.01)
H04L 51/216 (2022.01)

(52) U.S. Cl.
CPC .............. H04L 51/02 (2013.01); G06F 40/40 (2020.01); G06V 40/174 (2022.01); G06V 40/20 (2022.01); H04L 51/216 (2022.05)

(58) Field of Classification Search
CPC ....... H04L 51/02; H04L 51/216; H04L 51/04; H04L 51/52; G06F 40/40; G06V 40/174; G06V 40/20
See application file for complete search history.

(56) References Cited

U.S. PATENT DOCUMENTS

| | | | |
|---|---|---|---|
| 12,124,488 B1 * | 10/2024 | Rozenbaum | G06F 16/334 |
| 2013/0080928 A1 * | 3/2013 | Zhuang | H04L 12/1822 |
| | | | 715/758 |
| 2024/0404428 A1 * | 12/2024 | Gangjee | G06F 40/40 |

* cited by examiner

*Primary Examiner* — Soe Hlaing
(74) *Attorney, Agent, or Firm* — David R. Stevens; Stevens Law Group (57) ABSTRACT

A generative chatbot system for virtual community and a method thereof are disclosed. In the system, a client-end host is linked to a virtual community to receive a chat message; when the trigger signal is detected, the client-end host generates an operation interface for inputting the customized instruction, and transmits the chat message and the customized instruction to the server-end host, which can integrate the chat message as the context message having a timing logic and transmit the context message and the customized instruction to an AI device to generate a response message. The server-end host stores the response message received from the artificial intelligence device to a response list, so that the client-end host can select one of the response messages from the response list and output the selected response message to the virtual community.

10 Claims, 5 Drawing Sheets

GENERATIVE CHATBOT SYSTEM FOR VIRTUAL COMMUNITY AND METHOD THEREOF

CROSS-REFERENCE TO RELATED APPLICATION

This application claims the benefit of Chinese Application Serial No. 202311199533.2, filed Sep. 15, 2023, which is hereby incorporated herein by reference in its entirety.

BACKGROUND OF THE INVENTION

1. Field of the Invention

The present invention relates to a chatbot system and a method thereof, and more particularly to a generative chatbot system for virtual community and a method thereof.

2. Description of the Related Art

In recent years, with the popularity and vigorous development of the Internet, various Internet applications have sprung up; among the Internet applications, a virtual community is the most common.

Generally speaking, conventional virtual community usually interacts with other users through the Internet, such as chatting, discussing, etc. However, different users have different personalities, eloquence, or knowledge, so there may be obstacles for a user to participate in the chat when the user first participates in the chat or chats about unfamiliar topics, and it may cause that the user has nothing to say or is in awkward silence. In other words, chatting interaction may be not good enough due to personality, eloquence or unfamiliar topics.

In view of this, if the interaction in a virtual community can be detected and appropriate response suggestions or prompts can be proactively provided based on the interaction content, it may effectively assist users to chat smoothly. For example, in the multi-person conversation environment of virtual community, when the chat topic is changed to a knowledge area unfamiliar to a user, a chatbot which serves as a chat clone to actively and quickly give the user appropriate dialogue suggestions, the user's chat interactivity in virtual community can be effectively improved.

According to above-mentioned contents, what is needed is to develop an improved solution to solve the conventional problem that chatting interaction may be not good enough due to personality, eloquence or unfamiliar topics.

SUMMARY OF THE INVENTION

An objective of the present invention is to disclose a generative chatbot system for virtual community and a method thereof, so as to solve the conventional problem.

In order to achieve the objective, the present invention discloses a generative chatbot system for virtual community, and the generative chatbot system includes an artificial intelligence device, a client-end host, and a server-end host.

The artificial intelligence device is configured to receive a context message having a timing logic and receive a customized instruction, input the context message and the customized instruction to a large language model (LLM) to generate at least one response message through an application programming interface, and transmit the response message through the application programming interface. The client-end host includes a first non-transitory computer-readable storage medium and a first hardware processor. The first non-transitory computer-readable storage medium is configured to store first computer readable instructions. The first hardware processor is electrically connected to the first non-transitory computer-readable storage medium, and configured to execute the first computer readable instructions to make the client-end host execute: linking to the virtual community, and continuously capturing chat messages in the virtual community, wherein each of the chat message has a time message, a username, and a chat string; continuously detecting a trigger signal, generating an operation interface for inputting the customized instruction when presence of the trigger signal is detected, and transmitting each of the chat message and the customized instruction; when at least one response prompt message is received, displaying the response prompt message on the operation interface, and permitting to select and output one of the at least one response prompt message to the virtual community. The server-end host is connected to the artificial intelligence device and the client-end host, and includes a second non-transitory computer-readable storage medium and a second hardware processor. The second non-transitory computer-readable storage medium is configured to store second computer readable instructions. The second hardware processor is electrically connected to the second non-transitory computer-readable storage medium, and configured to execute the second computer readable instructions to make the server-end host execute: when chat messages from the client-end host are received, determining a sequence of the chat strings based on the time messages, determining a number of people chatting in the virtual community based on the usernames, determining a current chat topic and logic based on at least one keyword of the chat strings, and integrating the chat messages as the context message having the timing logic based on the determination result; transmitting the context message and the received customized instruction to the artificial intelligence device through the application programming interface, and receiving the response message from the artificial intelligence device, and storing the response message to a response list; automatically selecting and loading at least one of the response messages from the response list as the response prompt message.

In order to achieve the objective, the present invention discloses a generative chatbot method for virtual community, and the generative chatbot method includes steps of: connecting a server-end host to an artificial intelligence device and a client-end host, wherein the artificial intelligence device comprises an application programming interface; when the client-end host is linked to a virtual community, continuously capturing chat messages in the virtual community, wherein each of the chat messages has a time message, a username, and a chat string; continuously detecting a trigger signal, and when presence of the trigger signal is detected, generating an operation interface for inputting a customized instruction, and transmitting the chat message and the customized instruction to the server-end host, by the client-end host; when the chat messages from the client-end host are received, determining a sequence of the chat strings based on the time messages, determining a number of people chatting in the virtual community based on the usernames, determining a current chat topic and logic based on at least one keyword of the chat strings, and integrating the chat messages as the context message having the timing logic based on determination results, by the server-end host; transmitting the context message and the received customized instruction to the artificial intelligence device through the application programming interface, by the server-end host; inputting the received context message and the customized instruction to a large language model to generate at least one response message, and transmitting the response message to the server-end host, by the artificial intelligence device; storing the received response message to a response list, and automatically selecting and loading at least one of the response messages as at least one response prompt message from the response list, and displaying the at least one response prompt message on the operation interface, by the server-end host; permitting to select one of the loaded response prompt message and outputting the selected response prompt message to the virtual community, by the client-end host.

According to the above-mentioned system and method of the present invention, the difference between the present invention and the conventional technology is that, in the present invention, the client-end host is linked to the virtual community to receive the chat message; when the trigger signal is detected, the client-end host generates the operation interface for inputting the customized instruction, and transmits the chat message and the customized instruction to the server-end host, so that the server-end host can integrate the chat message as the context message having the timing logic, and transmit the context message and the customized instruction to the artificial intelligence device to generate the response message; the server-end host stores the response message received from the artificial intelligence device to the response list, so that the client-end host can select one of the response messages from the response list and output the selected response message to the virtual community.

Therefore, the technical solution of the present invention is able to achieve technical effect of reducing the impact in chat interaction due to personality, eloquence or unfamiliar topics.

BRIEF DESCRIPTION OF THE DRAWINGS

The structure, operating principle and effects of the present invention will be described in detail by way of various embodiments which are illustrated in the accompanying drawings.

DETAILED DESCRIPTION OF THE PREFERRED EMBODIMENTS

The following embodiments of the present invention are herein described in detail with reference to the accompanying drawings. These drawings show specific examples of the embodiments of the present invention. These embodiments are provided so that this disclosure will be thorough and complete, and will fully convey the scope of the invention to those skilled in the art. It is to be acknowledged that these embodiments are exemplary implementations and are not to be construed as limiting the scope of the present invention in any way. Further modifications to the disclosed embodiments, as well as other embodiments, are also included within the scope of the appended claims.

These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts. As used herein, the singular forms "a", "an" and "the" are intended to include the plural forms as well, unless the context clearly indicates otherwise.

It is to be acknowledged that, although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

It will be acknowledged that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the words "comprise" and "include", and variations such as "comprises", "comprising", "includes", or "including", will be acknowledged to imply the inclusion of stated elements but not the exclusion of any other elements.

Figure 1:
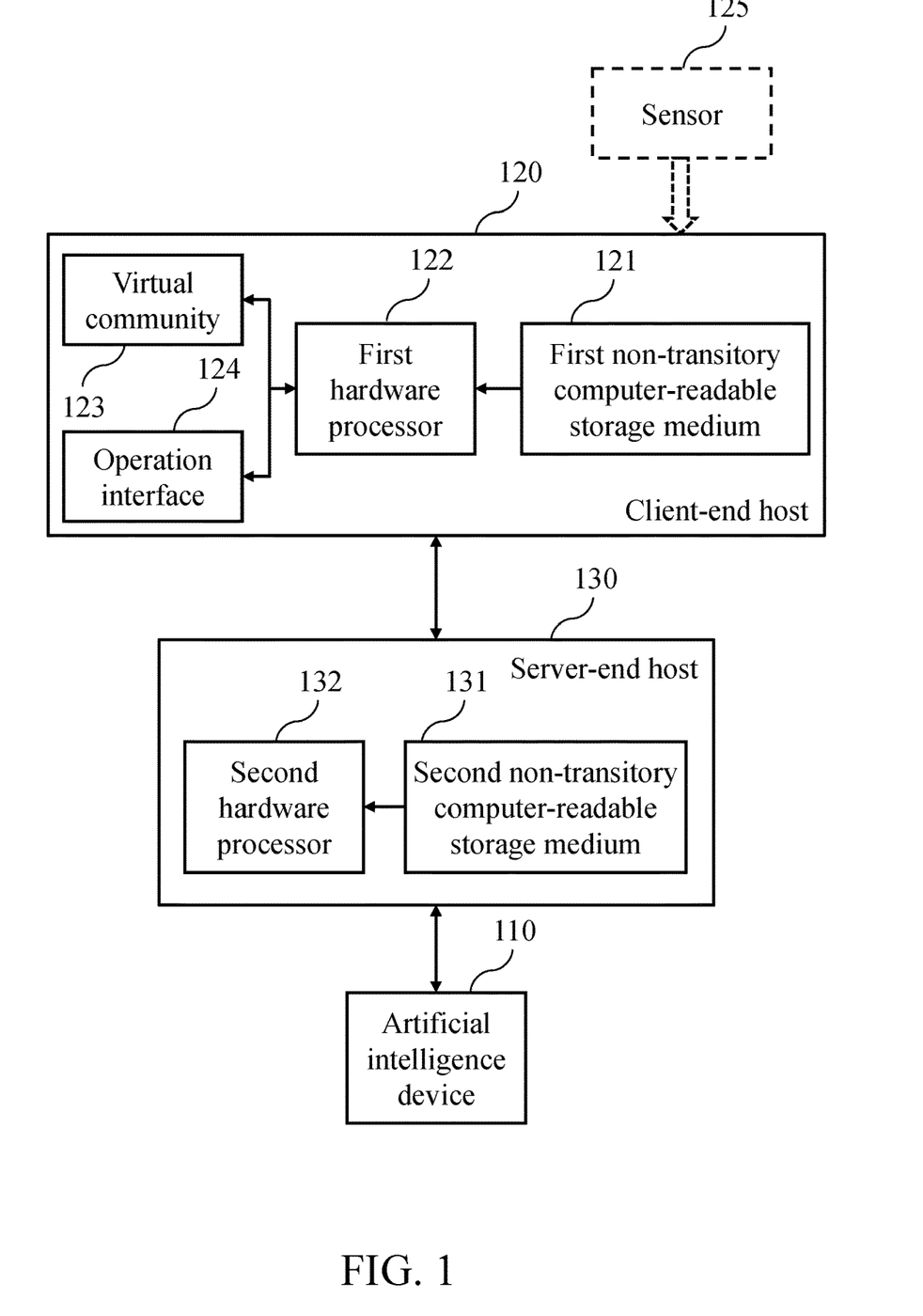
FIG. 1 is a block diagram of a generative chatbot system for a virtual community, according to the present invention.

Please refer to FIG. 1, which is a block diagram of a generative chatbot system for virtual community, according to the present invention. As shown in FIG. 1, the generative chatbot system includes an artificial intelligence (AI) device 110, a client-end host 120, and a server-end host 130. The artificial intelligence device 110 is configured to receive a context message having a timing logic through an application programming interface, receive a customized instruction, input both of the context message and the customized instruction to a large language model to generate a response message, and transmit the response message through the application programming interface. In actual implementation, the artificial intelligence device 110 is a chatbot using a large language model; the large language model can be, for example, generative pre-trained transformer (GPT), PaLM, Galactica, LLaMA, LaMDA or the like. The artificial intelligence device 110 can determine a stage, a topic evolution of current conversation and predict conversation development based on the context message and the corresponding timing logic, so that the predicted conversation is used as the response message; or the predicted conversation can be adjusted or assigned for someone based on the user's customized instruction.

The client-end host 120 includes a first non-transitory computer-readable storage medium 121 and a first hardware processor 122. The first non-transitory computer-readable storage medium 121 is configured to store the first computer readable instructions. In actual implementation, the first non-transitory computer-readable storage medium 121 can include, for example, a hard disk, an optical disk, flash memory or the like.

The first hardware processor 122 is electrically connected to the first non-transitory computer-readable storage medium 121, and configured to execute the first computer readable instructions to make the client-end host 120 execute the following operations: the client-end host 120 is linked to the virtual community 123, and continuously captures chat messages in the virtual community 123, wherein each chat message has a time message, a username, and a chat string; the client-end host 120 continuously detects a trigger signal, generates an operation interface 124 for inputting the customized instruction when detecting presence of the trigger signal, and transmits each of the chat messages and the customized instruction; when receiving the response prompt message, the client-end host 120 displays the response prompt message on the operation interface 124 and permits to select and output one of the response prompt messages to the virtual community 123. In actual implementation, the trigger signal is generated by at least one of pressing a physical button, clicking a software button on touch screen, and detecting a preset keyword appearing in the virtual community 123; the operation interface 124 is synchronously generated when the trigger signal is generated. When a user inputs the customized instruction on the operation interface 124, the client-end host 120 transmits the customized instruction to the server-end host 130, when a user selects one of the response prompt messages as a conversation message, the user is permitted to edit the selected conversation message first, and the edited conversation message is then transmitted to the virtual community 123 for display.

In an embodiment, the client-end host 120 can be connected to a sensor 125, the sensor 125 is configured to sense at least one of user's physiological statuses, facial expressions and body movements to generate a user behavior message, the client-end host 120 transmits the user behavior message to the server-end host 130, and the server-end host 130 determines the user's personality to set a personality parameter. For example, the server-end host 130 can sense a physiological feature (such as a blood pressure, heartbeat, pulse, or blood sugar) to determine a user's physiological status (such as: happiness, excitement, or depression); or the server-end host 130 can determine a facial expression or mood, by sensing face or irises; or the server-end host 130 can determine voice characteristics (such as: taciturn or eloquent) by sensing a tone or length of voice to set the personality parameter. Therefore, based on the sensed result, the personality parameter (such as: extroversion, introversion, enthusiasm, or coldness) can be set.

The server-end host 130 is connected to the artificial intelligence device 110 and the client-end host 120, and includes a second non-transitory computer-readable storage medium 131 and a second hardware processor 132. The second non-transitory computer-readable storage medium 131 is configured to store second computer readable instructions. In actual implementation, the difference between the second non-transitory computer-readable storage medium 131 and the first non-transitory computer-readable storage medium 121 is that the second non-transitory computer-readable storage medium 131 is disposed on the server-end host 130 and the first non-transitory computer-readable storage medium 121 is disposed on the client-end host 120, and the computer readable instructions respectively stored in the second non-transitory computer-readable storage medium 131 and the first non-transitory computer-readable storage medium 121 are different. In practice, the computer readable instructions for executing the operation of the present invention can be assembly language instructions, instruction-set-structure instructions, machine instructions, machine-related instruction, micro instructions, firmware instructions, or source codes or object codes programmed by at least one programming language. The programming language can include object oriented programming language such as Common Lisp, Python, C++, Objective-C, Smalltalk, Delphi, Java, Swift, C#, Perl, Ruby and PHP; the programming language can include a regular procedural programming language such as C language or similar programming language.

The second hardware processor 132 is electrically connected to the second non-transitory computer-readable storage medium 131, and configured to execute the second computer readable instructions to make the server-end host 130 execute the following operations: when receiving the chat message from the client-end host 120, the server-end host 130 determines a sequence of the chat strings based on the time messages, determines a number of people chatting in the virtual community 123 based on the usernames, determines a current chat topic and logic based on a keyword of the chat strings (for example, when term "lunch" appears repeatedly, this term is used as a keyword, the chat topic can be determined as "lunch"), and integrates the chat message as the context message having the timing logic based on the above-mentioned determination result; the server-end host 130 transmits the context message and the received customized instruction to the artificial intelligence device 110 through the application programming interface, receives the response message from the artificial intelligence device 110 and stores the response message to a response list; the server-end host 130 automatically selects and loads at least one of the response messages from the response list as the response prompt message. In actual implementation, the difference between the second hardware processor 132 and the first hardware processor 122 is that the second hardware processor 132 is disposed on the server-end host 130 and the first hardware processor 122 is disposed on the client-end host 120; each of the second hardware processor 132 and the first hardware processor 122 can be implemented by a central processing unit, a microprocessor or the like. In addition, the response message matching the personality parameter can be randomly filtered out from the response list and used as the response prompt message, and the client-end host 120 is permitted to link to the server-end host 130 to set the personality parameter. For example, when the personality parameter is set as "silent", the server-end host 130 filters out the response message having fewer wording from the response list as the response prompt message to avoid using words excessively different from the user's personality, which may make the interlocutor who is familiar with the user's personality feel awkward. In addition, the context message having a timing logic means the integration of chat messages based on time series and language logic, and the integration result is used as the context message. In practice, the number of people can be determined based on the usernames, a sequence of the conversation can be determined based on the time messages, and the topic can be determined based on the chat strings. For example, when a certain word appears in chat strings relatively frequently, this word can be regarded as a topic. The time message can also be used to determine the topic, for example, when the time is noon and a chat string shows "what to eat", the topic can be determined as a lunch discussion.

It is to be particularly noted that, in actual implementation, the present invention can be implemented fully or partly based on hardware, for example, one or more component of the system can be implemented by integrated circuit chip, system on chip (SOC), a complex programmable logic device (CPLD), or a field programmable gate array (FPGA). The non-transitory computer-readable storage medium of the present invention carries computer-readable instructions (or computer program instructions) for causing the processor to implement concepts of the present invention. The non-transitory computer-readable storage medium can be a tangible device that can hold and store instructions for use by an instruction execution device. The computer-readable storage medium can be a tangible apparatus for holding and storing the instructions executable of an instruction executing apparatus. The non-transitory computer-readable storage medium can be, but not limited to electronic storage apparatus, magnetic storage apparatus, optical storage apparatus, electromagnetic storage apparatus, semiconductor storage apparatus, or any appropriate combination thereof. More particularly, the non-transitory computer-readable storage medium can include a hard disk, an RAM memory, a read-only-memory, a flash memory, an optical disk, a floppy disc or any appropriate combination thereof, but this exemplary list is not an exhaustive list. The non-transitory computer-readable storage medium is not interpreted as the instantaneous signal such a radio wave or other freely propagating electromagnetic wave, or electromagnetic wave propagated through waveguide, or other transmission medium (such as optical signal transmitted through fiber cable), or electric signal transmitted through electric wire. Furthermore, the computer readable program instruction can be downloaded from the non-transitory computer-readable storage medium to each calculating/processing apparatus, or downloaded through network, such as internet network, local area network, wide area network and/or wireless network, to external computer equipment or external storage apparatus. The network includes copper transmission cable, fiber transmission, wireless transmission, router, firewall, switch, hub and/or gateway. The network card or network interface of each calculating/processing apparatus can receive the computer readable program instructions from network, and forward the computer readable program instruction to store in computer-readable storage medium of each calculating/processing apparatus.

Figure 2A:
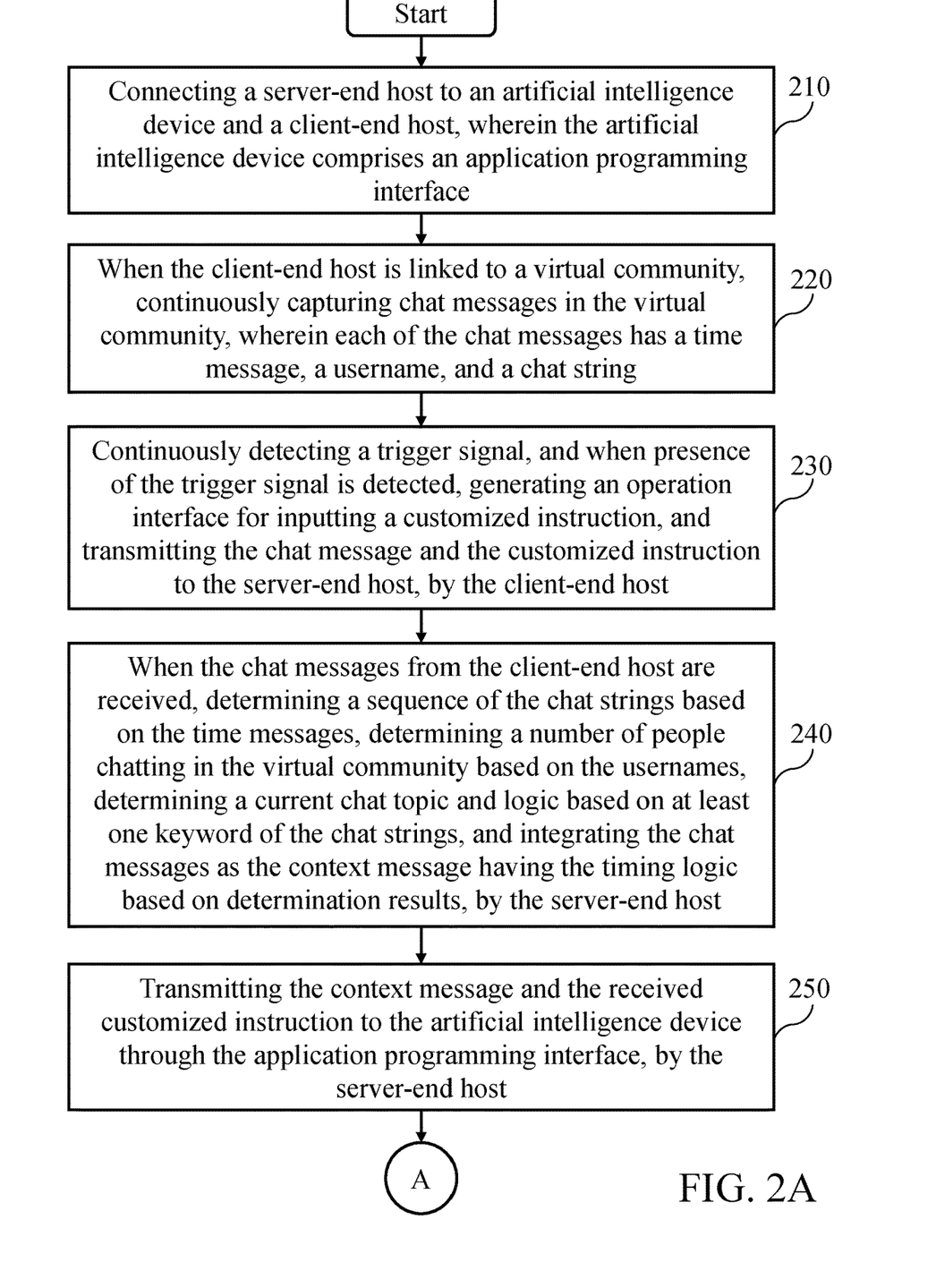
FIGS. 2A and 2B are flowcharts of a generative chatbot method for a virtual community, according to the present invention.
Figure 2B:
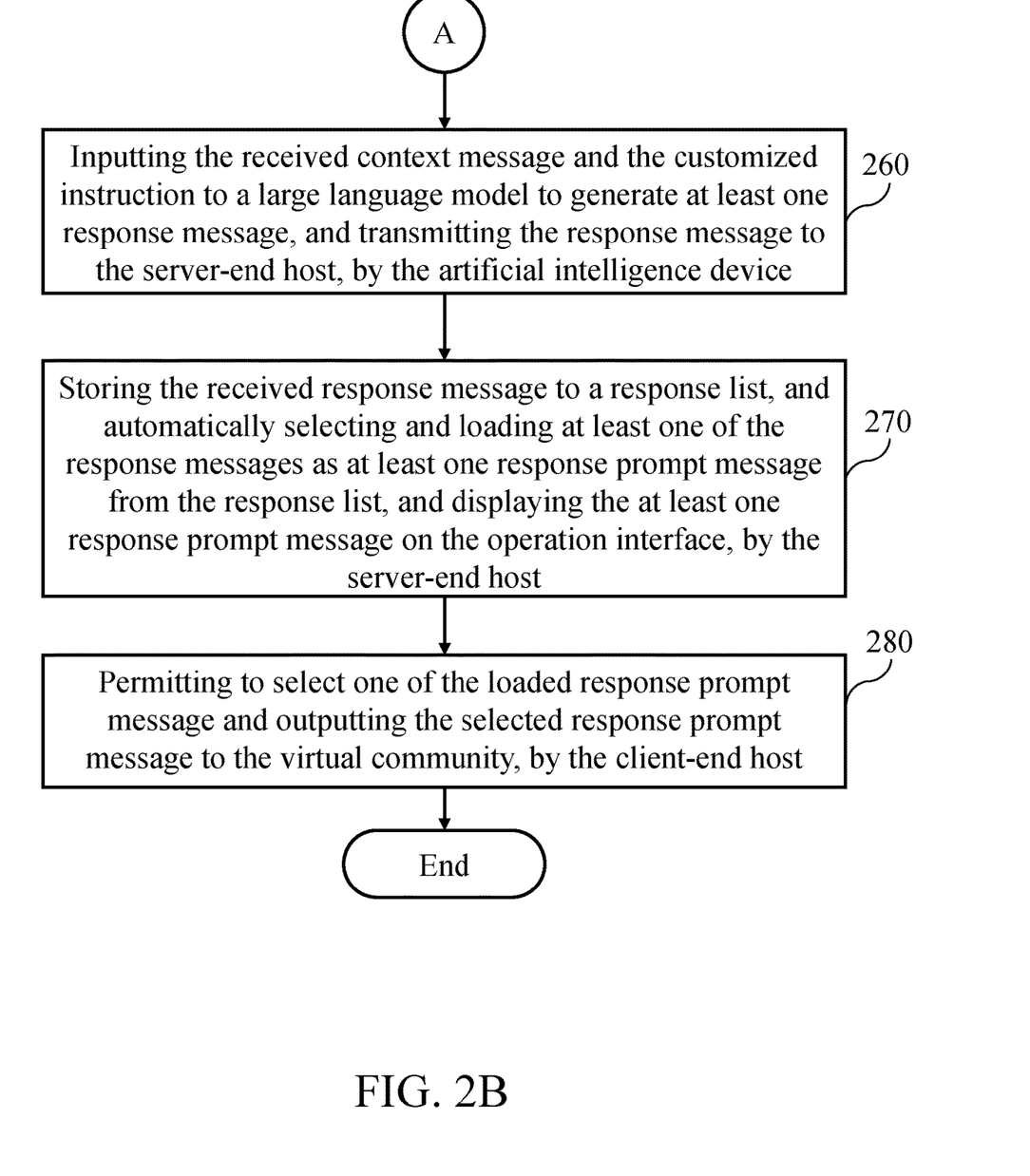

Please refer to FIGS. 2A and 2B, which are flowcharts of a generative chatbot method for virtual community, according to the present invention. The generative chatbot method includes the following steps. In a step 210, a server-end host 130 is connected to an artificial intelligence device 110 and a client-end host 120, wherein the artificial intelligence device 110 includes an application programming interface. In a step 220, when the client-end host 120 is linked to a virtual community 123, the client-end host 120 continuously captures chat messages in the virtual community 123, wherein each of the chat messages has a time message, a username, and a chat string. In a step 230, the client-end host 120 continuously detects a trigger signal, generates an operation interface 124 for inputting a customized instruction when presence of the trigger signal is detected, and transmits the chat message and the customized instruction to the server-end host 130. In a step 240, when the chat messages from the client-end host 120 are received, the server-end host 130 determines a sequence of the chat strings based on the time messages, determines a number of people chatting in the virtual community 123 based on the usernames, determines a current chat topic and logic based on at least one keyword of the chat strings, and integrates the chat messages as the context message having the timing logic based on determination results. In a step 250, the server-end host 130 transmits the context message and the received customized instruction to the artificial intelligence device 110 through the application programming interface. In a step 260, the artificial intelligence device 110 inputs the received context message and the customized instruction to a large language model to generate at least one response message, and transmitting the response message to the server-end host 130. In a step 270, the server-end host 130 stores the received response message to a response list, and automatically selecting and loading at least one of the response messages as at least one response prompt message from the response list, and displaying the at least one response prompt message on the operation interface 124. In a step 280, the client-end host 120 permits to select one of the loaded response prompt message and outputting the selected response prompt message to the virtual community 123. Through aforementioned steps, the client-end host 120 is linked to the virtual community 123 to receive the chat message; when the trigger signal is detected, the client-end host 120 generates the operation interface 124 for inputting the customized instruction, and transmits the chat message and the customized instruction to the server-end host 130, so that the server-end host 130 can integrate the chat message as the context message having the timing logic, and transmit the context message and the customized instruction to the artificial intelligence device 110 to generate the response message; the server-end host 130 stores the response message received from the artificial intelligence device 110 to the response list, so that the client-end host 120 can select one of the response messages from the response list and output the selected response message to the virtual community 123.

Figure 3:
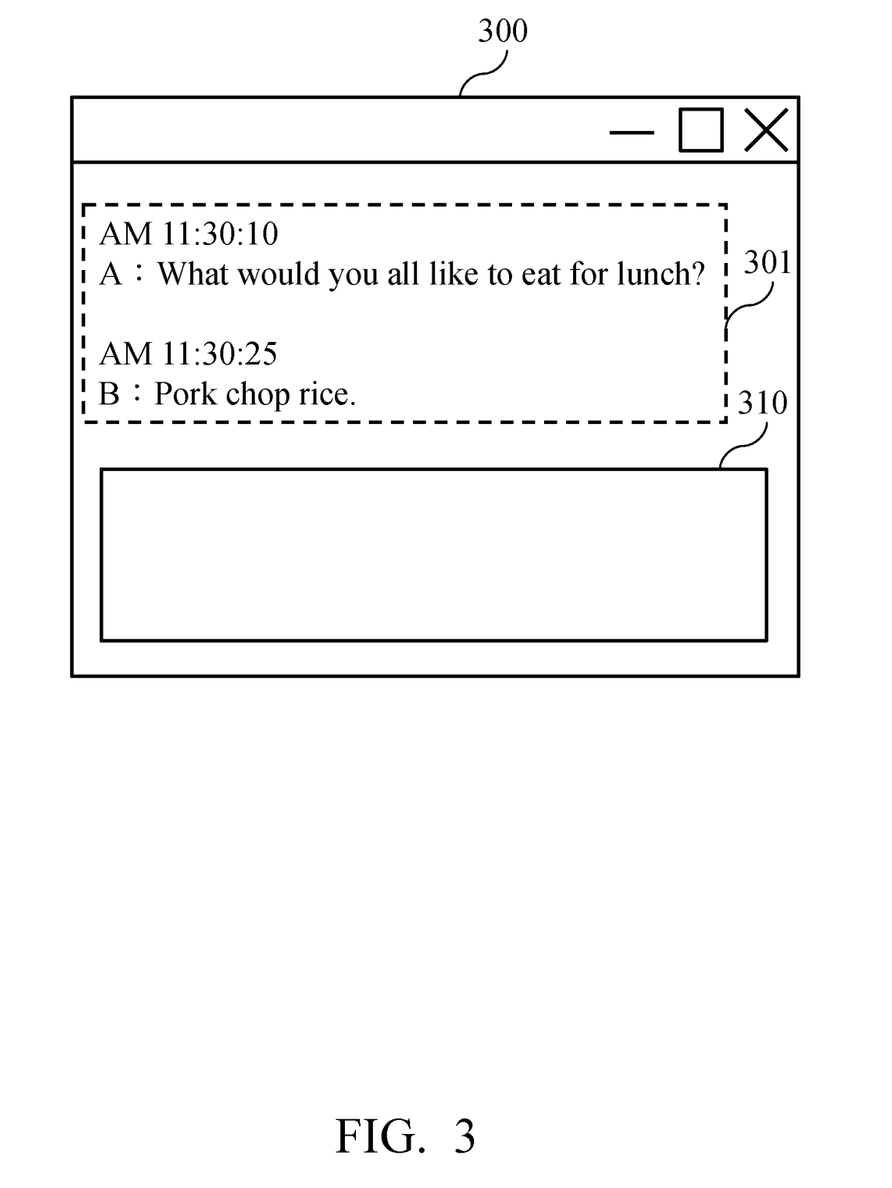
FIG. 3 is a schematic view of an operation of linking a virtual community to receive a chat message, according to an application of the present invention.

The embodiment of the present invention will be illustrated with reference to FIG. 3 and FIG. 4 in the following paragraphs. Please refer to FIG. 3, which is a schematic view of an operation of linking a virtual community to receive a chat message, according to an application of the present invention. In actual implementation, the user can link to the virtual community 123 (such as an online chat room, or an online conference room) through the client-end host 120. The client-end host 120 receives chat messages 301 from a window interface 300 of the virtual community 123, each of the chat messages includes a time message (such as: AM 11:30:10), a username (such as: "A"), and a chat string (such as: "What would you all like to eat for lunch?"). The client-end host 120 then continuously transmits the received chat messages to the server-end host 130, the server-end host 130 determines the sequence of the chat strings based on the time messages, determines a number of people chatting in the virtual community 123 based on the usernames, determines a current chat topic and logic based on a keyword of the chat strings, and integrates the chat messages as the context message having the timing logic based on the above-mentioned determination result. For example, the chat messages can be sorted and integrated based on the time sequence and natural language logic of the chat strings, for example, the order of the chat strings can be kept and the previous chat string is referred to keep the coherence of context messages and the same topic, and a meaningless chat string is removed, such as expression strings, tone strings (such as "hmm", "haha", "hehe"). The user can also directly input a string in an input block 310 to chat, and the string inputted by the user is displayed in the chat message 301 and also received by the client-end host 120 as the chat string.

Figure 4:
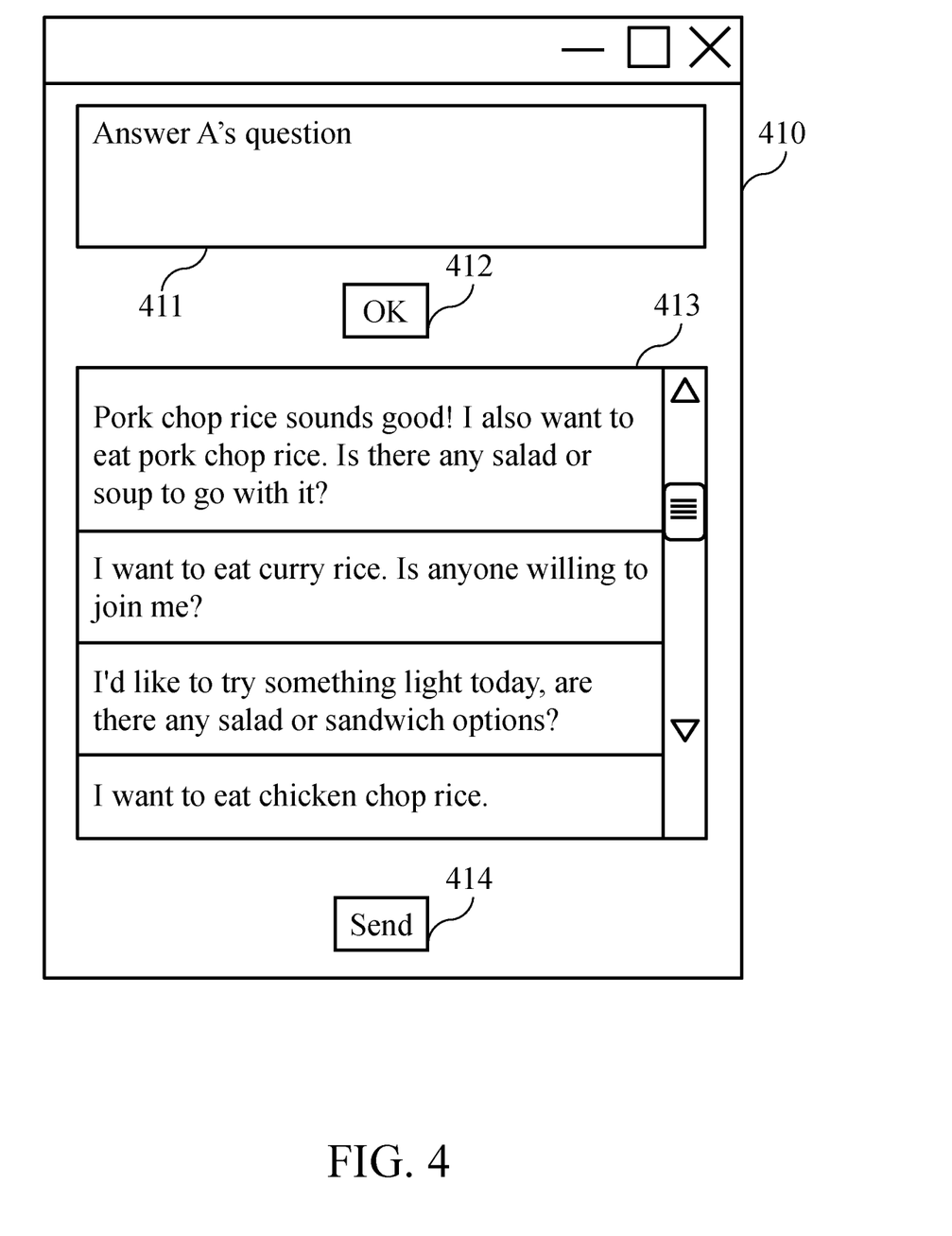
FIG. 4 is a schematic view of an operation interface where a customized instruction is inputted and a response prompt message is displayed, according to an application of the present invention.

As shown in FIG. 4, which is a schematic view of an operation interface where a customized instruction is inputted and a response prompt message is displayed, according to an application of the present invention. In actual implementation, the client-end host 120 can continuously detect the trigger signal, and when presence of the trigger signal is detected, the client-end host 120 generates an operation interface 410 for providing the user to input a customized instruction, for example, the user can type "answer a question of the user A" in the input box 411 as the customized instruction. After the user clicks an OK button 412, the client-end host 120 transmits the chat message and the inputted customized instruction to the server-end host 130. In fact, the user can also add time information in the customized instruction to make the customized instruction more clear, for example, the customized instruction can be "answer the question of the user asked at AM 11:30". In actual implementation, the user can generate the trigger signal by at least one of pressing a physical button, clicking a software button on a touch screen, and detecting a preset keyword (such as a username or a nickname) appearing in the virtual community 123.

In addition, after the server-end host 130 receives the response message generated by the artificial intelligence device 110 and stores the response message to the response list, the server-end host 130 automatically selects and loads at least one response prompt message from the response list and transmits the selected response prompt message to the client-end host 120, so that the selected response prompt message can be displayed on the selection block 413 of the operation interface 410 as shown in FIG. 4. Therefore, the user can directly select one of the response prompt messages through the cursor according to their own preferences without needing to think too much, and then click a send button 414 to output the selected response prompt message to the virtual community 123, so as to effectively reduce the impact on chat interactivity due to personality, eloquence or unfamiliar topics. It is to be noted that when automatically selecting and loading the at least one response prompt message, the server-end host 130 can select all response prompt messages, randomly select response prompt message, or filter the response prompt messages based on the personality parameter. The selection based on the personality parameter is taken as an example, when the personality parameter is set as "silent", the server-end host 130 selects the response message having the fewest words or having no extension intention; for example, when there are two response messages below:

1. I want to eat curry rice. Is anyone willing to join me?
2. I want to eat chicken chop rice.

The server-end host 130 selects the second response message as the response prompt message, because it meets the condition of having the least words or having no extended intention. It is to further explain that, the client-end host 120 is permitted to link to the server-end host 130 to set the personality parameter, for example, "a personality parameter is set as silent" can be inputted into the input box 411, and the OK button 412 is clicked to send the inputted data to the server-end host 130, so as to complete the setting operation.

According to above-mentioned contents, the difference between the present invention and the conventional technology is that, in the present invention, the client-end host is linked to the virtual community to receive the chat message; when the trigger signal is detected, the client-end host generates the operation interface for inputting the customized instruction, and transmits the chat message and the customized instruction to the server-end host, so that the server-end host can integrate the chat message as the context message having the timing logic, and transmit the context message and the customized instruction to the artificial intelligence device to generate the response message; the server-end host stores the response message received from the artificial intelligence device to the response list, so that the client-end host can select one of the response messages from the response list and output the selected response message to the virtual community.

Therefore, the technical solution of the present invention is able to solve the conventional problem, so as to achieve technical effect of reducing the impact in chat interaction due to personality, eloquence or unfamiliar topics.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. A generative chatbot system for virtual community, comprising:

an artificial intelligence device, configured to receive a context message having a timing logic and receive a customized instruction, input the context message and the customized instruction to a large language model (LLM) to generate at least one response message through an application programming interface, and transmit the response message through the application programming interface;

a client-end host, comprising:
 a first non-transitory computer-readable storage medium, configured to store first computer readable instructions; and
 a first hardware processor, electrically connected to the first non-transitory computer-readable storage medium, and configured to execute the first computer readable instructions to make the client-end host execute:
  linking to the virtual community, and continuously capturing chat messages in the virtual community, wherein each of the chat message has a time message, a username, and a chat string;
  continuously detecting a trigger signal, generating an operation interface for inputting the customized instruction when presence of the trigger signal is detected, and transmitting each of the chat message and the customized instruction; and
  when at least one response prompt message is received, displaying the response prompt message on the operation interface, and permitting to select and output one of the at least one response prompt message to the virtual community; and a server-end host, connected to the artificial intelligence device and the client-end host, and comprising:
 a second non-transitory computer-readable storage medium, configured to store second computer readable instructions; and
 a second hardware processor, electrically connected to the second non-transitory computer-readable storage medium, and configured to execute the second computer readable instructions to make the server-end host execute:
  when the chat messages from the client-end host are received, determining a sequence of the chat strings based on the time message, determining a number of people chatting in the virtual community based on the usernames, determining a current chat topic and logic based on at least one keyword of the chat strings, and integrating the chat messages as the context message having the timing logic based on the determination result;

transmitting the context message and the received customized instruction to the artificial intelligence device through the application programming interface, and receiving the response message from the artificial intelligence device, and storing the response message to a response list; and automatically selecting and loading at least one of the response messages from the response list as the response prompt message.

2. The generative chatbot system for virtual community according to claim 1, wherein the response prompt message is a response message matching a personality parameter and randomly filtered out from the response list, and the client-end host is permitted to connect to the server-end host to set the personality parameter.

3. The generative chatbot system for virtual community according to claim 2, wherein the client-end host is connected to at least one sensor configured to sense at least one of user's physiological statuses, facial expressions and body movements to generate a user behavior message, the client-end host transmits the user behavior message to the server-end host, and the server-end host sets the personality parameter based on the user behavior message.

4. The generative chatbot system for virtual community according to claim 1, wherein the trigger signal is generated by at least one of pressing a physical button, clicking a software button on touch screen, and detecting a preset keyword appearing in the virtual community, and the operation interface is synchronously generated when the trigger signal is generated.

5. The generative chatbot system for virtual community according to claim 4, wherein when the customized instruction is inputted on the operation interface, the customized instruction is transmitted to the server-end host, when one of the response prompt messages is selected as a conversation message on the operation interface, the selected conversation message is permitted to edit first, and the edited conversation message is transmitted to the virtual community for display.

6. A generative chatbot method for virtual community, comprising:

connecting a server-end host to an artificial intelligence device and a client-end host, wherein the artificial intelligence device comprises an application programming interface;

when the client-end host is linked to a virtual community, continuously capturing chat messages in the virtual community, wherein each of the chat messages has a time message, a username, and a chat string;

continuously detecting a trigger signal, and when presence of the trigger signal is detected, generating an operation interface for inputting a customized instruction, and transmitting the chat message and the customized instruction to the server-end host, by the client-end host;

when the chat messages from the client-end host are received, determining a sequence of the chat strings based on the time messages, determining a number of people chatting in the virtual community based on the usernames, determining a current chat topic and logic based on at least one keyword of the chat strings, and integrating the chat messages as the context message having the timing logic based on determination results, by the server-end host;

transmitting the context message and the received customized instruction to the artificial intelligence device through the application programming interface, by the server-end host;

inputting the received context message and the customized instruction to a large language model to generate at least one response message, and transmitting the response message to the server-end host, by the artificial intelligence device;

storing the received response message to a response list, and automatically selecting and loading at least one of the response messages as at least one response prompt message from the response list, and displaying the at least one response prompt message on the operation interface, by the server-end host; and permitting to select one of the loaded response prompt message and outputting the selected response prompt message to the virtual community, by the client-end host.

7. The generative chatbot method for virtual community according to claim 6, wherein the response prompt message is a response message matching a personality parameter and randomly filtered out from the response list, and the client-end host is permitted to connect to the server-end host to set the personality parameter.

8. The generative chatbot method for virtual community according to claim 7, wherein the client-end host is connected to at least one sensor configured to sense at least one of user's physiological statuses, facial expressions and body movements to generate a user behavior message, the client-end host transmits the user behavior message to the server-end host, and the server-end host sets the personality parameter based on the user behavior message.

9. The generative chatbot method for virtual community according to claim 6, wherein the trigger signal is generated by at least one of pressing a physical button, clicking a software button on touch screen, and detecting a preset keyword appearing in the virtual community, and the operation interface is synchronously generated when the trigger signal is generated.

10. The generative chatbot method for virtual community according to claim 9, wherein when the customized instruction is inputted on the operation interface, the customized instruction is transmitted to the server-end host, when one of the response prompt messages is selected as a conversation message on the operation interface, the selected conversation message is permitted to edit first, and the edited conversation message is transmitted to the virtual community for display.

* * * * *